(12) United States Patent
Lu et al.

(10) Patent No.: US 10,797,487 B2
(45) Date of Patent: Oct. 6, 2020

(54) ON-LINE INPUT CONTROL METHOD, ON-LINE INPUT AND QUIT DEVICE FOR VOLTAGE-SOURCE CONVERTER UNIT

(71) Applicants: NR ELECTRIC CO., LTD, Nanjing, Jiangsu (CN); NR ENGINEERING CO., LTD, Nanjing, Jiangsu (CN)

(72) Inventors: Jiang Lu, Jiangsu (CN); Yu Lu, Jiangsu (CN); Yunlong Dong, Jiangsu (CN); Nannan Wang, Jiangsu (CN); Yongping Wang, Jiangsu (CN); Wenqiang Zhao, Jiangsu (CN); Jie Tian, Jiangsu (CN); Haiying Li, Jiangsu (CN)

(73) Assignees: NR ELECTRIC CO., LTD, Nanjing, Jiangsu (CN); NR ENGINEERING CO., LTD, Nanjing, Jiangsu (CN)

( * ) Notice: Subject to any disclaimer, the term of this patent is extended or adjusted under 35 U.S.C. 154(b) by 0 days.

(21) Appl. No.: 16/345,426

(22) PCT Filed: Nov. 24, 2017

(86) PCT No.: PCT/CN2017/112844
§ 371 (c)(1),
(2) Date: Apr. 26, 2019

(87) PCT Pub. No.: WO2018/095405
PCT Pub. Date: May 31, 2018

(65) Prior Publication Data
US 2019/0252885 A1    Aug. 15, 2019

(30) Foreign Application Priority Data

Nov. 25, 2016 (CN) .......................... 2016 1 105 9115
Nov. 22, 2017 (CN) .......................... 2017 1 117 0510

(51) Int. Cl.
*H02J 3/36* (2006.01)
*H02M 5/458* (2006.01)
(Continued)

(52) U.S. Cl.
CPC ................. *H02J 3/36* (2013.01); *H02M 1/32* (2013.01); *H02M 5/4585* (2013.01);
(Continued)

(58) Field of Classification Search
CPC ...... H02M 1/32; H02M 5/4585; H02M 7/483; H02M 2001/325; H02M 2007/4835; H02J 3/36; Y02E 60/60
See application file for complete search history.

(56) References Cited

U.S. PATENT DOCUMENTS 9,893,633 B1 * 2/2018 Li ..................... H02M 3/33546
2017/0302189 A1 * 10/2017 Jakob ................... H02H 7/1213
(Continued)

FOREIGN PATENT DOCUMENTS

CN    103840479 A    6/2014
CN    104578130 A    4/2015
(Continued)

*Primary Examiner* — Kyle J Moody
*Assistant Examiner* — Lakaisha Jackson
(74) *Attorney, Agent, or Firm* — Young Basile Hanlon & MacFarlane, P.C.

(57) ABSTRACT

Provided is an on-line input and quit control method for a voltage-source converter unit. The method achieves the on-line input of a voltage-source converter unit by means of performing steps, such as charging control, deblocking transfer control and operation adjustment control, on a voltage-source converter to be input, and achieves the on-line quitting of the voltage-source converter unit by means of performing steps, such as direct-current voltage reduction control, bypass transfer control and converter blocking control, on a voltage-source converter to be quit. Correspond- (Continued)

ingly, provided is an on-line input and quit control device for a voltage-source converter unit, which can achieve the on-line steady input and quitting of a voltage-source converter in a series-type hybrid direct-current power transmission system or a series-type flexible direct-current power transmission system, without affecting the normal and stable operation of other already running converters.

7 Claims, 6 Drawing Sheets

(51) Int. Cl.
      *H02M 1/32*       (2007.01)
      *H02M 7/483*      (2007.01)

(52) U.S. Cl.
      CPC ...... *H02M 7/483* (2013.01); *H02M 2001/325* (2013.01); *H02M 2007/4835* (2013.01); *Y02E 60/60* (2013.01)

(56) References Cited

U.S. PATENT DOCUMENTS

2019/0052177 A1* 2/2019 Lu ............... H02M 3/33569
2019/0386578 A1* 12/2019 Kajiyama ........... H02M 7/1557

FOREIGN PATENT DOCUMENTS

| CN | 104953568 A | 9/2015 |
|----|-------------|--------|
| CN | 106786713 A | 5/2017 |

* cited by examiner

ON-LINE INPUT CONTROL METHOD, ON-LINE INPUT AND QUIT DEVICE FOR VOLTAGE-SOURCE CONVERTER UNIT

CROSS-REFERENCE TO RELATED APPLICATION(S)

This application is a 371 application of International Application No. PCT/CN2017/112844, filed on Nov. 24, 2017, which claims priority to Chinese Patent Application No. 201711170510.3, filed on Nov. 22, 2017, and Chinese Patent Application No. 201611059115.3, filed on Nov. 25, 2016, the contents of all of which are herein incorporated by reference in their entireties.

TECHNICAL FIELD

Aspects of the present disclosure relate to the technical field of direct current transmission, and more particularly, to an on-line input and quit control method and device for voltage-source converter unit.

BACKGROUND

High voltage direct current power transmission system comprises two types: thyristor converter based conversional direct current power transmission system (LCC-HVDC) and fully controlled voltage-source converter based flexible direct current power transmission system (VSC-HVDC). The conversional direct current power transmission system is low in cost and loss, and its operating technology is mature. Nowadays, the vast majority of direct current power transmission systems running in the world are LCC-HVDC systems. However, conversional direct current power transmission systems have the drawbacks of inverter side being prone to commutation failure, strong dependence on the alternating current system, needing to absorb a large amount of reactive power, and the converter station occupying large area, etc. The new generation of flexible direct current power transmission system has the advantages of achieving decoupling control of active power and reactive power, supplying power to passive network, compact structure, occupying small area, no commutation failure, etc. However, flexible direct current power transmission system also has the drawback of high cost. Therefore, the advantages of conversional direct current transmission and flexible direct current transmission are combined, and a hybrid direct current transmission technology, i.e., a thyristor converter applied in a converter station at one end and a voltage-source converter applied in a converter station at the other end, has good engineering application prospects. From a long-term perspective, with the decrease of the price of fully controlled components used in a voltage-source converter, the flexible direct current transmission technology with voltage-source converters applied in both ends of a converter station will also get more and more widely used.

In order to meet the requirement of long-distance large-capacity current transmission, the conversional direct current transmission project applies the technology of connecting two or more thyristor converters in series to improve the direct current voltage level and the transmission capacity of a direct current power transmission system. At present, a plurality of direct current transmission projects of series connected thyristor converters have completed and put into operation. With respect to the series connected hybrid direct current transmission technology of a converter station at the one end with series connected thyristor converters and a converter station at the other end with series connected voltage-source converters and the series connected flexible direct current transmission technology of series connected voltage-source converters applied in both end, they are still in the research stage at present.

With respect to the direct current power transmission system applying the technology of series connected converters, the requirement for the main loop topology and the control system is to realize a converter's on-line input and quit during direct current pole's operation, so as to meet the following requirements during the operation of series connected two or more converters of the direct current pole: 1) single converter can be on-line quitted for overhaul, and can be on-line input to run after the overhaul; 2) the on-line input and quit of single converter do not affect the normal operation of other converters. The above requirements can ensure the operation's flexibility and reliability of the series connected direct current power transmission system. Nowadays, the on-line input and quit method of a converter in the direct current power transmission system with series connected thyristor converter is mature.

With respect to series connected hybrid direct current power transmission system and series connected flexible direct current power transmission system, if the on-line input and quit of the voltage-source converter is also implemented according to the control method of the direct current power transmission system with series connected thyristor converter, because the voltage-source converter has capacitor energy storage component, it will cause a serious failure like positive and negative short circuit at direct current side in the voltage-source converter, resulting in the failure of the converter's on-line input and quit.

At present, no on-line input and quit control method for voltage-source converter in a series connected direct current power transmission system has been proposed. Therefore, it is necessary to combine with the characteristics of voltage-source converter to provide an on-line input and quit control method and device for a voltage-source converter, so as to meet the requirement of operation and maintenance for a series-type hybrid direct-current power transmission system or a series-type flexible direct-current power transmission system.

SUMMARY

With respect to the above drawbacks, the present disclosure aims to provide an on-line input and quit control method and device for a voltage-source converter unit, for realizing on-line input and quit of single voltage-source converter during the operation of series connected two or more converters of the direct current pole of a direct current power transmission system, so as to meet the requirement of operation and maintenance for a series-type hybrid direct-current power transmission system or a series-type flexible direct-current power transmission system.

In order to achieve the above objective, the technical solution of the present disclosure is to provide an on-line input control method for a voltage-source converter unit. The voltage-source converter unit comprises a first unit isolation knife gate D1, a voltage-source converter, a second unit isolation knife gate D2, which are connected in series, and connecting wires. The starting point and the ending point of the above series connected loop are a first DC (direct current) point X1 and a second DC point X2 of the voltage-source converter unit respectively for series connecting to other voltage-source converter units. The voltage-source converter unit further comprises a unit bypass knife gate D3, which is bridge jointed between the first DC point X1 and the second DC point X2. The voltage-source converter unit further comprises a unit bypass switch S1, which is bridge jointed between the end Y1 of the first unit isolation knife gate D1 close to the voltage-source converter and the end Y2 of the second unit isolation knife gate D2 close to the voltage-source converter. The on-line input control method comprises the following steps.

Step 1: when receiving an issued instruction of on-line input voltage-source converter unit, closing the second unit isolation knife gate D2 of the voltage-source converter unit to be input, so that the negative end Z2 of the voltage-source converter to be input is connected to the second DC point X2 through the second unit isolation knife gate D2;

Step 2: closing the AC (alternating current) inlet switch S2 of a converter transformer corresponding to the voltage-source converter unit to be input, controlling the charge of the voltage-source converter to be input, and charging the capacitor voltage of each bridge arm submodule of the voltage-source converter to be input to a set threshold;

Step 3: stopping the charging control, making the submodule turned on during the charging control to be in a blocked state, closing the unit bypass switch S1 and the first unit isolation knife gate D1 of the voltage-source converter unit to be input, and then opening the unit bypass knife gate D3;

Step 4: deblocking the voltage-source converter to be input and controlling the output DC voltage $U_{dV}$ thereof to be 0, then controlling the voltage-source converter to be input to output negative DC voltage, increasing the amplitude of the negative DC voltage output by the voltage-source converter to be input so as to increase the direct current flowing through the voltage-source converter to be input and decrease the direct current flowing through the unit bypass switch S1 of the voltage-source converter unit to be input; when the direct current flowing through the voltage-source converter to be input has been increased to equal to the measurement value of the direct current of an operating voltage-source converter, opening the unit bypass switch S1 of the voltage-source converter unit to be input;

Step 5: if the converter station of the voltage-source converter unit to be input is a DC voltage control station, controlling the DC voltage $U_{dV}$ output by the voltage-source converter to be input to an operating target value; and if the converter station of the voltage-source converter unit to be input is a direct current control station or a DC power control station, controlling the direct current flowing through the voltage-source converter to be input to an operating target value; then the input of the voltage-source converter unit to be input is completed.

In step 4 of on-line input for a voltage-source converter unit, the method of deblocking the voltage-source converter unit to be input and controlling the output DC voltage thereof $U_{dV}$ to be 0 specifically comprises: setting voltage reference waves with O-axis symmetry, equal amplitude and reverse phase for upper and lower bridge arms in each phase of the voltage-source converter to be input and deblocking.

During the on-line input of the voltage-source converter unit, the order of inputting on-line converter unit is implemented as follow: first, inputting the converter unit of the direct current control station or the DC power control station, and then inputting the converter unit of the DC voltage control station.

The present disclosure also provides an on-line normal quit control method for a voltage-source converter unit. The voltage-source converter unit comprises a first unit isolation knife gate D1, a voltage-source converter, a second unit isolation knife gate D2, which are connected in series, and connecting wires. The starting point and the ending point of the above series connected loop are a first DC point X1 and a second DC point X2 of the voltage-source converter unit respectively for series connecting to other voltage-source converter units. The voltage-source converter unit further comprises a unit bypass knife gate D3, which is bridge jointed between the first DC point X1 and the second DC point X2. The voltage-source converter unit further comprises a unit bypass switch S1, which is bridge jointed between the end Y1 of the first unit isolation knife gate D1 close to the voltage-source converter and the end Y2 of the second unit isolation knife gate D2 close to the voltage-source converter. The on-line normal quit control method comprises the following steps.

Step 1: when receiving an issued instruction of on-line normal quit the converter unit, controlling the output DC voltage $U_{dV}$ of the voltage-source converter to be quitted to 0;

Step 2: closing the unit bypass switch S1 of the voltage-source converter unit to be quitted, so that the direct current flowing through the voltage-source converter to be quitted is transferred to the unit bypass switch S1;

Step 3: blocking the voltage-source converter to be quitted and opening the AC inlet switch S2 of a converter transformer corresponding to the voltage-source converter unit to be quitted;

Step 4: closing the unit bypass knife gate D3 of the voltage-source converter unit to be quitted, then opening the unit bypass switch S1, the first unit isolation knife gate D1, and the second unit isolation knife gate D2 in sequence, quitting the voltage-source converter unit to be quitted.

During the above procedure of on-line quit of the voltage-source converter unit, the on-line normal converter unit quit is operated in the order of quitting the converter unit of the DC voltage control station, then quitting the converter unit of the direct current control station or the DC power control station.

The voltage-source converter unit may comprise an electronic switch formed by at least one semiconductor switching device. The electronic switch is connected in parallel between the positive end and the negative end of the voltage-source converter or is connected in parallel between the positive end and the negative end of a submodule of the voltage-source converter. The conduction direction of the semiconductor switching device of the electronic switch is consistent with the direction of the direct current flowing through the voltage-source converter, and is keep in an off state during the normal operation of the voltage-source converter. The semiconductor switching device of the electronic switch is a single semiconductor switching device or is a plurality of semiconductor switching devices connected in series and/or in parallel. With respect to the voltage-source converter unit configured with the electronic switch, step A can be added between step 1 and step 2 of the on-line normal quit control method: triggering all the semiconductor switching devices of the electronic switch of the voltage-source converter unit to be quitted to provide a current channel for direct current; step B can be added between step 3 and step 4: blocking all the semiconductor switching devices of the electronic switch of the voltage-source converter unit to be quitted.

The present disclosure also provides an on-line malfunction quit control method for a voltage-source converter unit. The voltage-source converter unit comprises a first unit isolation knife gate D1, a voltage-source converter, a second unit isolation knife gate D2, which are connected in series, and connecting wires. The starting point and the ending point of the above series connected loop are a first DC point X1 and a second DC point X2 of the voltage-source converter unit respectively for series connecting to other voltage-source converter units. The voltage-source converter unit further comprises a unit bypass knife gate D3, which is bridge jointed between the first DC point X1 and the second DC point X2. The voltage-source converter unit further comprises a unit bypass switch S1, which is bridge jointed between the end Y1 of the first unit isolation knife gate D1 close to the voltage-source converter and the end Y2 of the second unit isolation knife gate D2 close to the voltage-source converter. The on-line malfunction quit control method comprises the following steps.

Step 1: after identifying the voltage-source converter unit's malfunction by detecting electrical quantity and/or non-electrical quantity, sending an on-line malfunction quit instruction to the converter unit to be quitted;

Step 2: blocking the voltage-source converter to be quitted, and opening the AC inlet switch S2 of a converter transformer corresponding to the voltage-source converter unit to be quitted;

Step 3: closing the unit bypass switch S1 of the voltage-source converter unit to be quitted, so that the direct current flowing through the voltage-source converter to be quitted is transferred to the unit bypass switch S1;

Step 4: closing the unit bypass knife gate D3 of the voltage-source converter unit to be quitted, then opening the unit bypass switch S1, the first unit isolation knife gate D1, and the second unit isolation knife gate D2 in sequence, quitting the voltage-source converter unit to be quitted.

With respect to the voltage-source converter unit configured with the electronic switch, step A can be added between step 1 and step 2 of the on-line malfunction quit control method: triggering all the semiconductor switching devices of the electronic switch of the voltage-source converter unit to be quitted to provide a current channel for direct current; step B can be added between step 3 and step 4: blocking all the semiconductor switching devices of the electronic switch of the voltage-source converter unit to be quitted.

The present disclosure also provides an on-line input device for a voltage-source converter unit. The voltage-source converter unit comprises a first unit isolation knife gate D1, a voltage-source converter, a second unit isolation knife gate D2, which are connected in series, and connecting wires. The starting point and the ending point of the above series connected loop are a first DC point X1 and a second DC point X2 of the voltage-source converter unit respectively for series connecting to other voltage-source converter units. The voltage-source converter unit further comprises a unit bypass knife gate D3, which is bridge jointed between the first DC point X1 and the second DC point X2. The voltage-source converter unit further comprises a unit bypass switch S1, which is bridge jointed between the end Y1 of the first unit isolation knife gate D1 close to the voltage-source converter and the end Y2 of the second unit isolation knife gate D2 close to the voltage-source converter. The on-line input device comprises a first operation unit for sequential connection, a charging control unit, a second operation unit for sequential connection, a control unit for deblocking transfer, and an operation adjustment unit, wherein:

The first operation unit for sequential connection is used for closing the second unit isolation knife gate D2 of the voltage-source converter unit to be input, so that the negative end Z2 of the voltage-source converter unit to be input is connected to the second DC point X2 through the second unit isolation knife gate D2 to trigger the charging control unit;

The charging control unit is used for closing the AC inlet switch S2 of a converter transformer corresponding to the voltage-source converter unit to be input to control the charge of the voltage-source converter to be input, and charging the capacitor voltage of each bridge arm submodule of the voltage-source converter to be input to a set threshold to trigger the second operation unit for sequential connection;

The second operation unit for sequential connection is used for stopping the charging control, making the submodule turned on during the charging control to be in a blocked state, closing the unit bypass switch S1 and the first unit isolation knife gate D1 of the voltage-source converter unit to be input, and then opening the unit bypass knife gate D3 to trigger the control unit for deblocking transfer;

The control unit for deblocking transfer is used for deblocking the voltage-source converter to be input and controlling the output DC voltage $U_{dV}$ thereof to be 0, then controlling the voltage-source converter to be input to output negative DC voltage, increasing the amplitude of the negative DC voltage output by the voltage-source converter to be input so as to increase the direct current flowing through the voltage-source converter to be input and decrease the direct current flowing through the unit bypass switch S1 of the voltage-source converter unit to be input; when the direct current flowing through the voltage-source converter to be input has been increased to equal to the measurement value of the direct current of an operating voltage-source converter, opening the unit bypass switch S1 of the voltage-source converter unit to be input to trigger the operation adjustment unit;

The operation adjustment unit is used for, if the converter station of the voltage-source converter unit to be input is a DC voltage control station, controlling the DC voltage $U_{dV}$ output by the voltage-source converter to be input to an operating target value; and if the converter station of the voltage-source converter unit to be input is a direct current control station or a DC power control station, controlling the direct current flowing through the voltage-source converter to be input to an operating target value; then the input of the voltage-source converter unit to be input is completed.

The control unit for deblocking transfer also comprises a zero-voltage deblocking unit. The zero-voltage deblocking unit is used for setting voltage reference waves with O-axis symmetry, equal amplitude and reverse phase for upper and lower bridge arms in each phase of the voltage-source converter to be input and deblocking, so that the DC voltage $U_{dV}$ output by the voltage-source converter to be input is 0.

The present disclosure also provides an on-line quit device for a voltage-source converter unit. The voltage-source converter unit comprises a first unit isolation knife gate D1, a voltage-source converter, a second unit isolation knife gate D2, which are connected in series, and connecting wires. The starting point and the ending point of the above series connected loop are a first DC point X1 and a second DC point X2 of the voltage-source converter unit respectively for series connecting to other voltage-source converter units. The voltage-source converter unit further comprises a unit bypass knife gate D3, which is bridge jointed between the first DC point X1 and the second DC point X2. The voltage-source converter unit further comprises a unit bypass switch S1, which is bridge jointed between the end Y1 of the first unit isolation knife gate D1 close to the voltage-source converter and the end Y2 of the second unit isolation knife gate D2 close to the voltage-source converter. The on-line quit device comprises a DC reduction voltage control unit, a bypass transfer control unit, a converter blocking control unit, and a knife gate sequence operation unit, wherein:

The working method for on-line normal quit operations is as follow.

The DC reduction voltage control unit is used for controlling the output DC voltage $U_{dV}$ of the voltage-source converter to be quitted to 0 to trigger the bypass transfer control unit;

The bypass transfer control unit is used for closing the unit bypass switch S1 of the voltage-source converter unit to be quitted, so that the direct current flowing through the voltage-source converter to be quitted is transferred to the unit bypass switch S1 to trigger the converter blocking control unit;

The converter blocking control unit is used for blocking the voltage-source converter unit to be quitted and opening the AC inlet switch S2 of a converter transformer corresponding to the voltage-source converter unit to be quitted to trigger the knife gate sequence operation unit;

The knife gate sequence operation unit is used for closing the unit bypass knife gate D3 of the voltage-source converter unit to be quitted, then opening the unit bypass switch S1, the first unit isolation knife gate D1, and the second unit isolation knife gate D2 in sequence, quitting the voltage-source converter unit to be quitted.

The working method for on-line malfunction quit operations is as follow.

The converter blocking control unit is used for blocking the voltage-source converter to be quitted, and opening the AC inlet switch S2 of a converter transformer corresponding to the voltage-source converter unit to be quitted to trigger the bypass transfer control unit;

The bypass transfer control unit is used for closing the unit bypass switch S1 of the voltage-source converter unit to be quitted, so that the direct current flowing through the voltage-source converter to be quitted is transferred to the unit bypass switch S1 to trigger the knife gate sequence operation unit;

The knife gate sequence operation unit is used for closing the unit bypass knife gate D3 of the voltage-source converter unit to be quitted, then opening the unit bypass switch S1, the first unit isolation knife gate D1, and the second unit isolation knife gate D2 in sequence, quitting the voltage-source converter unit to be quitted.

With respect to the voltage-source converter unit configured with the electronic switch, the above on-line quit device also comprises an electronic switch control unit, which is used for triggering all the semiconductor switching devices of the electronic switch of the voltage-source converter unit to be quitted to provide a current channel for direct current and used for blocking all the semiconductor switching devices of the electronic switch of the voltage-source converter unit to be quitted.

The beneficial effect of the present disclosure is that:

The on-line input and quit control method and device for a voltage-source converter unit provided by the present disclosure can achieve the on-line steady input and quitting of a voltage-source converter in a series-type hybrid direct-current power transmission system or a series-type flexible direct-current power transmission system, without affecting the normal and stable operation of other already running converters.

DETAILED DESCRIPTION

The technical solutions of the present disclosure will be described fully below referring to the accompanying drawings and the implementations.

The present disclosure provides an on-line input and quit control method and device for a voltage-source converter unit, for realizing on-line input and quit of single voltage-source converter during the operation of series connected two or more converters of the direct current pole of a direct current power transmission system, so as to meet the requirement of operation and maintenance for a series-type hybrid direct-current power transmission system or a series-type flexible direct-current power transmission system.

Figure 1:
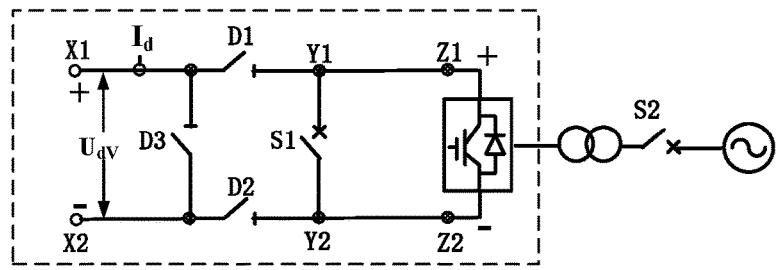
FIG. 1 illustrates a topological structure diagram of a voltage-source converter unit according to the present disclosure.
Figure 2:
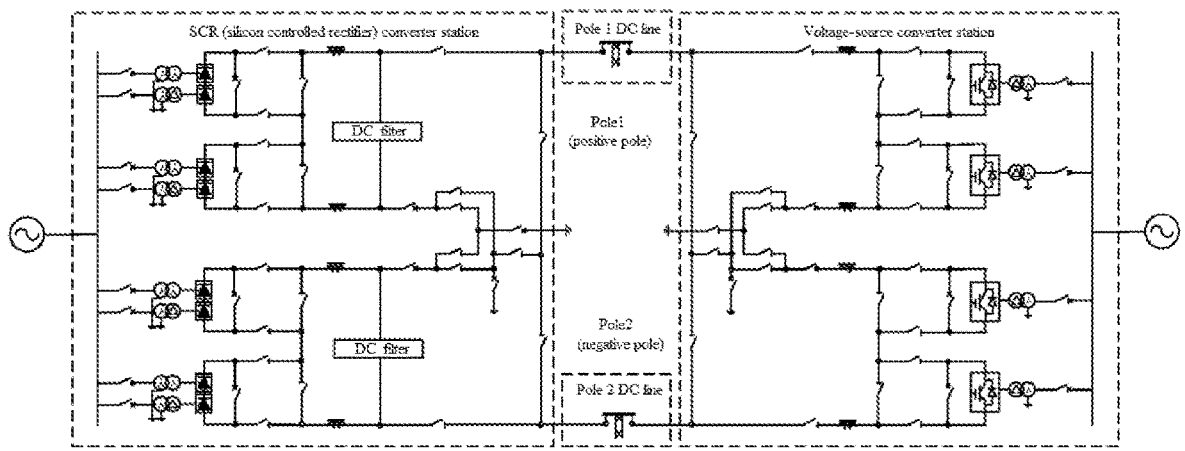
FIG. 2 illustrates a schematic diagram of a main loop of a two-end bipolar series-type hybrid direct-current power transmission system of a voltage-source converter unit according to the present disclosure.
Figure 3:
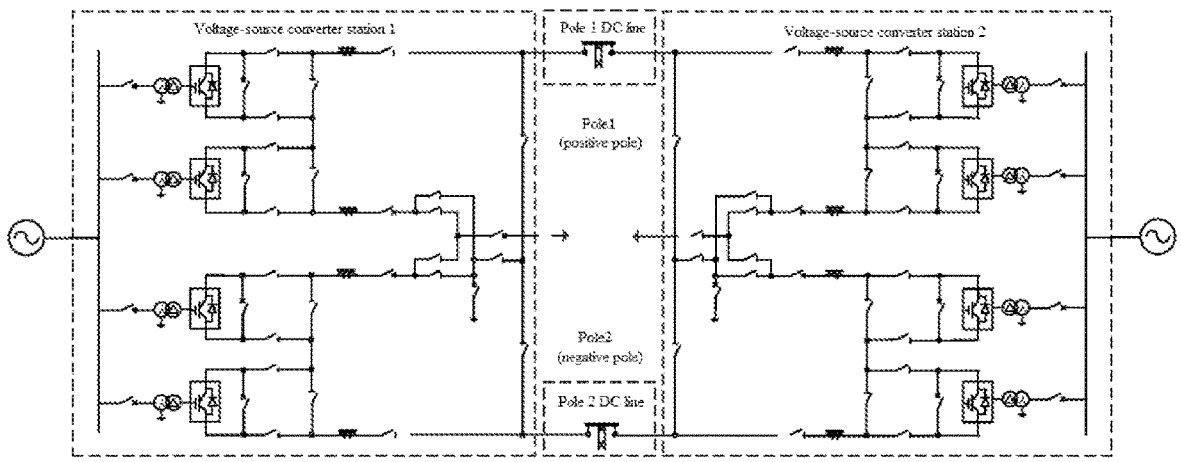
FIG. 3 illustrates a schematic diagram of a main loop of a two-end series-type bipolar flexible direct-current power transmission system of a voltage-source converter unit according to the present disclosure.

In order to achieve the above objective, the technical solution of the present disclosure is to provide an on-line input control method for a voltage-source converter unit to achieve an on-line input of the voltage-source converter unit during the running a direct-current pole. The topological structure of the voltage-source converter unit is illustrated in FIG. 1, which comprises a first unit isolation knife gate D1, a voltage-source converter, a second unit isolation knife gate D2, which are connected in series, and connecting wires. The starting point and the ending point of the above series connected loop are a first DC point X1 and a second DC point X2 of the voltage-source converter unit respectively for series connecting to other voltage-source converter units. The voltage-source converter unit further comprises a unit bypass knife gate D3, which is bridge jointed between the first DC point X1 and the second DC point X2. The voltage-source converter unit further comprises a unit bypass switch S1, which is bridge jointed between the end Y1 of the first unit isolation knife gate D1 close to the voltage-source converter and the end Y2 of the second unit isolation knife gate D2 close to the voltage-source converter. FIG. 2 illustrates a main loop of a two-end bipolar series-type hybrid direct-current power transmission system of the voltage-source converter unit. FIG. 3 illustrates a main loop of a two-end bipolar series-type flexible direct-current power transmission system of the voltage-source converter unit.

Figure 4:
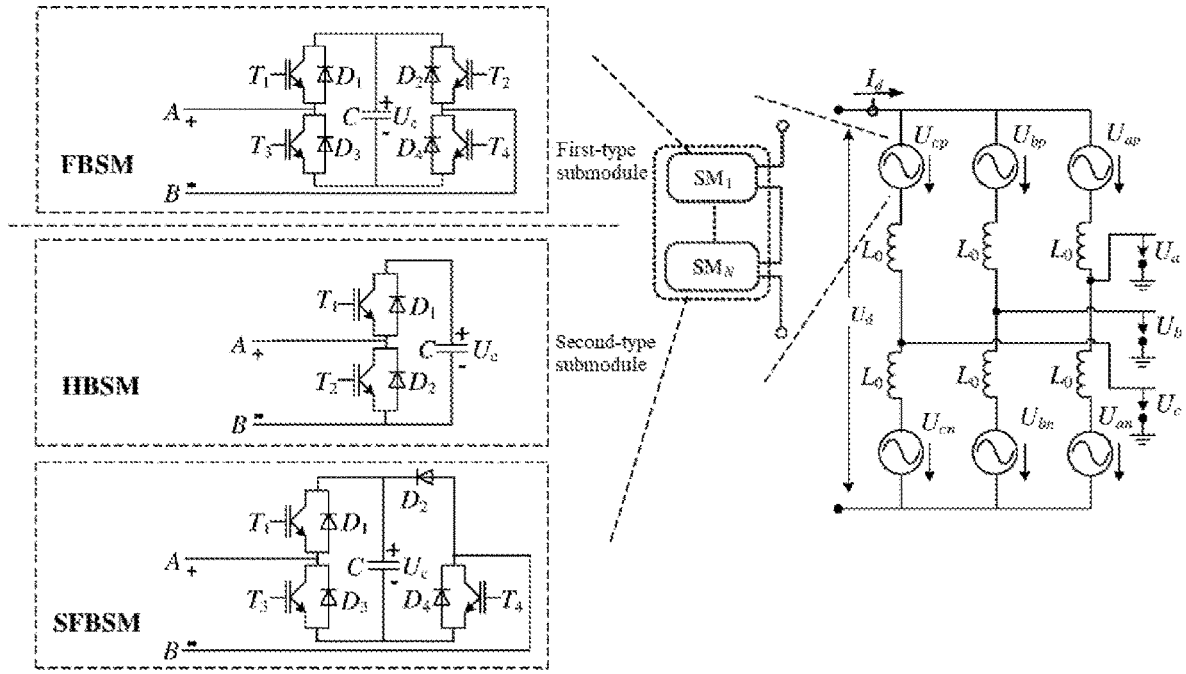
FIG. 4 illustrates a topological diagram of the voltage-source converter in the voltage-source converter unit according to the present disclosure, wherein both the upper and the lower bridge arms of each phase is formed by cascading a first type submodules or by hybrid cascading a first type submodules and a second type submodules.

The voltage-source converter of the voltage-source converter unit uses the modularization and multi-level structure illustrated in FIG. 4, and comprises the following submodules of two types or one type:

A first-type submodule is a submodule that can output three levels of positive, negative and zero in the deblocked state, such as a full bridge submodule (FBSM), etc.

A second-type submodule is a submodule that can only output two levels of positive and zero in the deblocked state, such as a half bridge submodule (HBSM), a similar full bridge submodule (SFBSM), etc.

The submodules comprise fully-controlled switching devices, such as IGBT, IGCT, IEGT, GTO, etc.

The configuration ways for the submodules of arm bridges in the voltage-source converter of the voltage-source converter unit comprises the following two configurations:

Configuration 1, both upper and lower arms of each phase are formed by cascading the first-type submodules;

Configuration 2: both upper and lower arms of each phase are hybrid bridge arms formed by cascading the first-type submodules and the second-type submodules according to a certain quantitative proportion, and the quantitative proportion of the two types of submodules in each arm bridge is the same. Configuration 2 reduces the number of the first-type submodule used in arm bridge of the voltage-source converter, reduces the voltage-source converter's design cost and operation loss, and thus has higher engineering application value.

Figure 5:
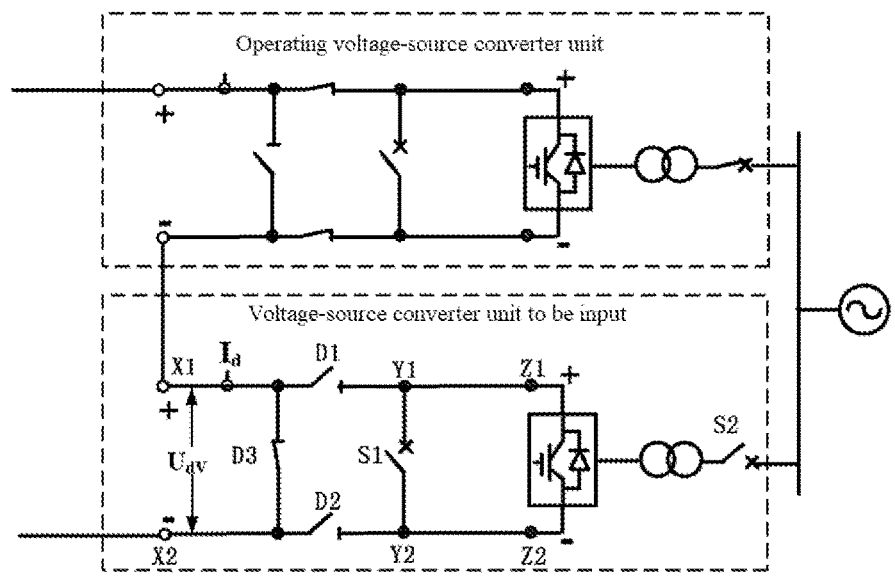
FIG. 5 illustrates a status diagram of a voltage-source converter unit already run and a voltage-source converter unit to be input before beginning the on-line input operation.

Before beginning the operation of on-line input, the status diagram of a voltage-source converter unit already run and a voltage-source converter unit to be input is illustrated in FIG. 5. The first unit isolation knife gate D1, the second unit isolation knife gate D2, the unit bypass switch S1, and an AC inlet switch S2 of the voltage-source converter unit to be input are open, and the unit bypass knife gate D3 is closed.

Figure 11:
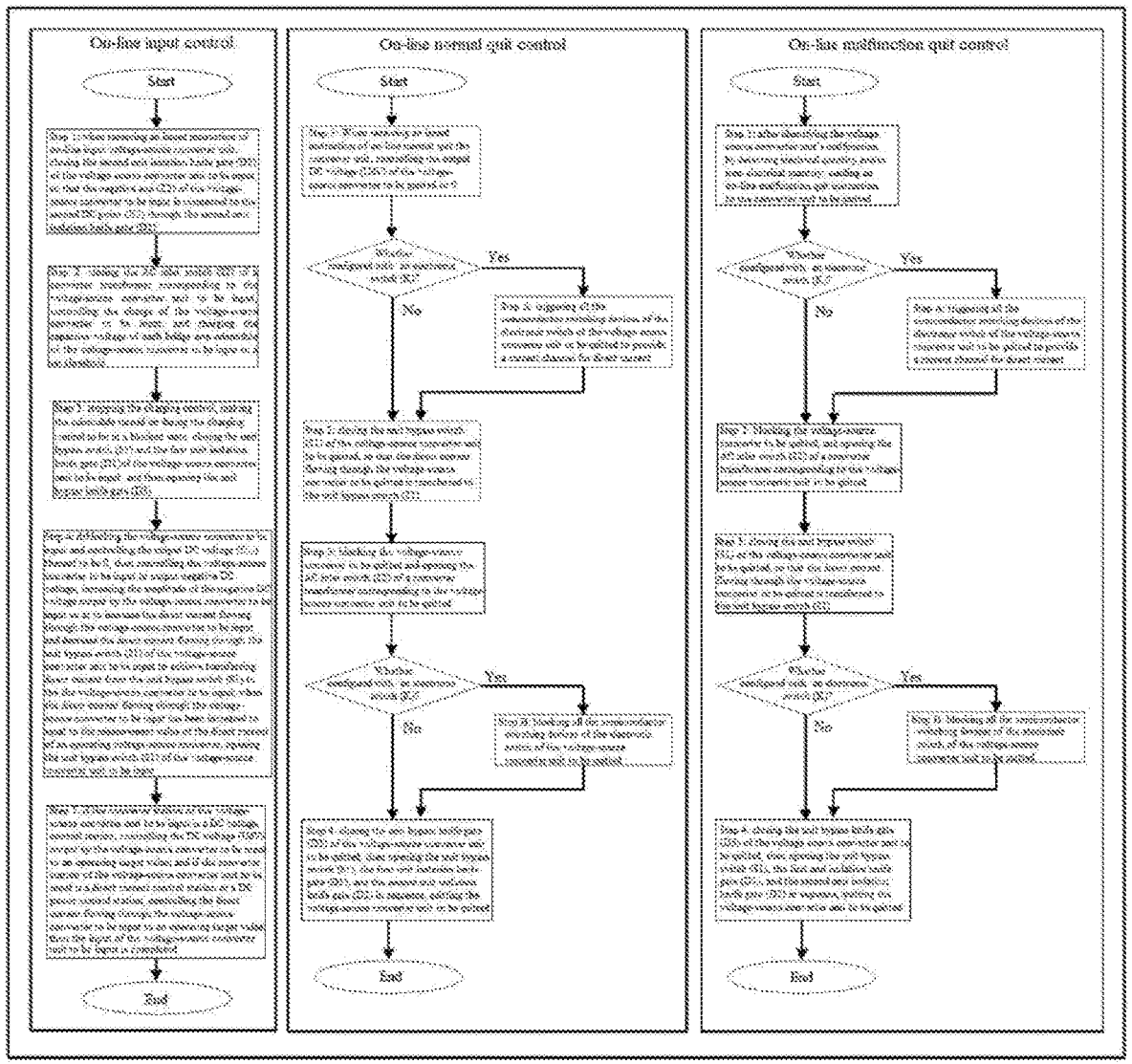
FIG. 11 illustrates a flow chart of an on-line input and quit control method for a voltage-source converter unit according to the present disclosure.

FIG. 11 illustrates the on-line input control method for a voltage-source converter unit, which comprises the following steps.

Figure 6:
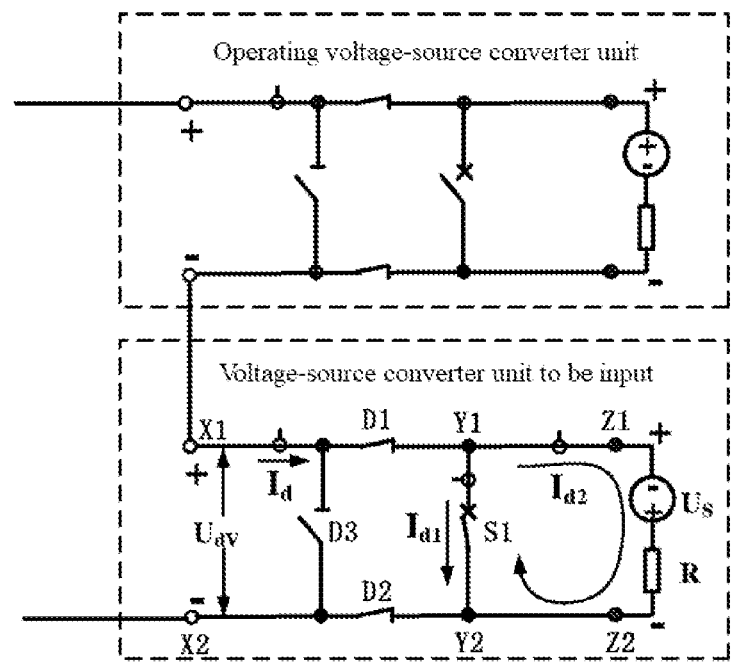
FIG. 6 illustrates a DC-side status diagram of a voltage-source converter unit already run and a voltage-source converter unit to be input before starting the procedure of transferring direct current.

Step 1: when receiving an issued instruction of on-line input voltage-source converter unit, closing the second unit isolation knife gate D2 of the voltage-source converter unit to be input, so that the negative end Z2 of the voltage-source converter to be input is connected to the second DC point X2 through the second unit isolation knife gate D2;

Step 2: closing the AC inlet switch S2 of a converter transformer corresponding to the voltage-source converter unit to be input, conducting uncontrolled AC charge to the voltage-source converter to be input, setting a numerical value close to the rated value as the threshold, and starting charging control to charge the capacitor voltage of each bridge arm submodule of the voltage-source converter to be input to the set threshold;

Step 3: stopping the charging control, making the submodule turned on during the charging control to be in a blocked state, closing the unit bypass switch S1 and the first unit isolation knife gate D1 of the voltage-source converter unit to be input, and then opening the unit bypass knife gate D3;

After step 3, the procedure of deblocking the voltage-source converter unit to be input and transferring direct current should be started. First, the voltage-source converter to be input is deblocked and the output DC voltage $U_{dV}$ is 0. Before starting the procedure of transferring direct current, a DC-side status of a voltage-source converter unit already run and a voltage-source converter unit to be input is illustrated in FIG. 6. At this time, $I_{d1}$ is equal to $I_d$ and $I_{d2}$ is equal to 0, wherein $I_d$ is the direct current flowing through the voltage-source converter unit already run and the voltage-source converter unit to be input, $I_{d1}$ is the direct current flowing through the unit bypass switch S1 of the voltage-source converter unit to be input, and $I_{d2}$ is the direct current flowing through the voltage-source converter to be input.

With respect to the voltage-source converter unit to be input, according to the Kirchhoff's Current Law, $I_d=I_{d1}+I_{d2}$ can be got.

In order to achieve transferring direct current from the unit bypass switch S1 to the voltage-source converter to be input, while maintaining $I_d$ unchanged, it needs to increase $I_{d2}$ and reduce $I_{d1}$, so that $I_{d2}$ is increased to equal to $I_d$ and $I_{d1}$ is reduced to 0.

After researching, the DC-side control characteristics of the voltage-source converter to be input can be equivalent to a controlled voltage-source $U_S$ and a resistor R. The direct current transferring loop in the voltage-source converter unit to be input can be equivalent to the closed loop formed by a controlled voltage-source, a resistor, and the unit bypass switch S1 connected in series illustrated in FIG. 6, controlling the controlled voltage-source $U_S$ corresponding to the voltage-source converter to be input to output negative DC voltage, so as to generate current $I_{d2}$ with flowing direction opposite to that of current $I_{d1}$. With the increase of the amplitude of the negative DC voltage output by the controlled voltage-source $U_S$ corresponding to the voltage-source converter to be input, $I_{d2}$ is increased gradually, $I_{d1}$ is reduced gradually. When $I_{d2}$ is increased to equal to $I_d$, $I_1$ is reduced to 0. At this time, opening the unit bypass switch S1 to complete transferring the direct current, and the following steps subsequent to step 3 can be obtained:

Step 4: deblocking the voltage-source converter to be input and controlling the output DC voltage $U_{dV}$ thereof to be 0, then controlling the voltage-source converter to be input to output negative DC voltage, increasing the amplitude of the negative DC voltage output by the voltage-source converter to be input so as to increase the direct current flowing through the voltage-source converter to be input and decrease the direct current flowing through the unit bypass switch S1; when the direct current flowing through the voltage-source converter to be input has been increased to equal to the measurement value of the direct current of a running voltage-source converter, opening the unit bypass switch S1 of the voltage-source converter unit to be input.

Figure 7:
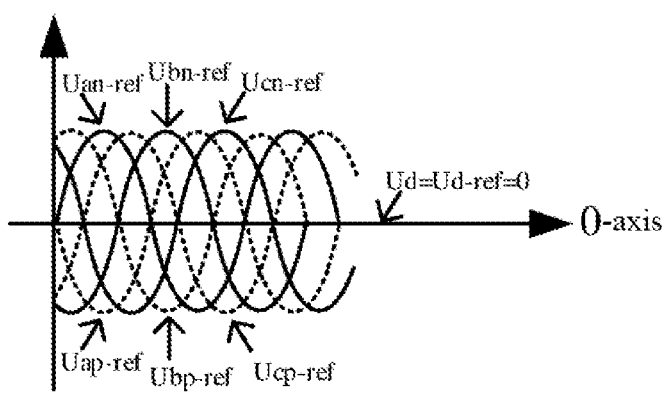
FIG. 7 illustrates an oscillogram of a voltage reference wave output by a three-phase upper and lower arm bridges when the DC voltage output by a voltage-source converter of the voltage-source converter unit is 0.
Figure 8:
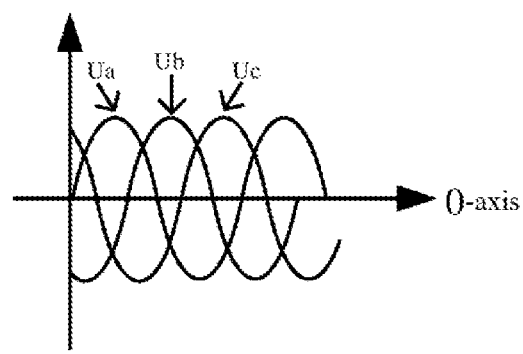
FIG. 8 illustrates an oscillogram of a three-phase AC voltage when the DC voltage output by a voltage-source converter of the voltage-source converter unit is 0.

The above method of deblocking the voltage-source converter to be input and controlling direct current voltage $U_{dV}$ thereof to be 0 specifically comprises: setting the direct current reference value $U_{dV-ref}$ of the voltage-source converter to be input to be 0 under the control of a constant voltage and deblocking. At this time, the voltage-source converter to be input outputs voltage reference waves with O-axis symmetry, equal amplitude and reverse phase for upper and lower bridge arms in each phase, as illustrated in FIG. 7. $U_{an\text{-}ref}$, $U_{bn\text{-}ref}$, and $U_{cn\text{-}ref}$ are respectively the voltage reference waves of the three-phase (A, B, and C) lower bridge arms of the voltage-source converter to be input. $U_{ap\text{-}ref}$, $U_{bp\text{-}ref}$, and $U_{cp\text{-}ref}$ are respectively the voltage reference waves of the three-phase (A, B, and C) upper bridge arms of the voltage-source converter to be input. $U_{dV}$ is the DC voltage output by the voltage-source converter to be input. $U_{dV\text{-}ref}$ is the DC voltage reference value of the voltage-source converter to be input. At this time, the three-phase AC voltage wave corresponding to the voltage-source converter to be input is illustrated in FIG. 8, wherein $U_a$, $U_b$, and $U_c$ are the three-phase (A, B, and C) AC voltages.

Step 5: if the converter station of the voltage-source converter unit to be input is a DC voltage control station, maintaining the control mode of the voltage-source converter to be input at a constant voltage control mode to increase the DC voltage reference value $U_{dV\text{-}ref}$ to an operating target value at a certain rate of slope, and under the control of the DC voltage controller, the DC voltage $U_{dV}$ output by the voltage-source converter is also increased to the operating target value at a certain rate of slope; and if the converter station of the voltage-source converter unit to be input is a direct current control station or a DC power control station, smoothly switching the control mode of the voltage-source converter to be input to be a constant current control mode, setting the direct current reference value to a direct current operating target value of this DC pole; under the control of the direct current controller, adjusting the direct current flowing through the voltage-source converter to the direct current operating target value of this DC pole; then the input of the voltage-source converter unit to be input is completed.

With respect to a two-end direct current power transmission system, the usually used control mode is that a converter station at one end controls direct current or DC power, and a converter station at the other end controls DC voltage. The two-end converter stations cooperate with each other to maintain the DC transmission power at a target value. The control modes switch between the two-end converter stations.

During the on-line input of the voltage-source converter unit, the order of inputting on-line converter unit is as follow: first, inputting the converter unit of the direct current control station or the DC power control station, and then inputting the converter unit of the DC voltage control station.

The present disclosure also provides an on-line normal quit control method for a voltage-source converter unit. The voltage-source converter unit comprises a first unit isolation knife gate D1, a voltage-source converter, a second unit isolation knife gate D2, which are connected in series, and connecting wires. The starting point and the ending point of the above series connected loop are a first DC point X1 and a second DC point X2 of the voltage-source converter unit respectively for series connecting to other voltage-source converter units. The voltage-source converter unit further comprises a unit bypass knife gate D3, which is bridge jointed between the first DC point X1 and the second DC point X2. The voltage-source converter unit further comprises a unit bypass switch S1, which is bridge jointed between the end Y1 of the first unit isolation knife gate D1 close to the voltage-source converter and the end Y2 of the second unit isolation knife gate D2 close to the voltage-source converter. FIG. 11 illustrates the on-line normal quit control method, which comprises the following steps.

Step 1: when receiving an issued instruction of on-line normal quit the converter unit, if the converter station of the voltage-source converter unit to be quitted is a DC voltage control station, maintaining the control mode of the voltage-source converter to be quitted at a constant voltage control mode to decrease the DC voltage reference value $U_{dV\text{-}ref}$ thereof to 0 at a certain rate of slope; and under the control of the DC voltage controller, the DC voltage $U_{dV}$ output by the voltage-source converter is also decreased to 0 at a certain rate of slope; and if the converter station of the voltage-source converter unit to be quitted is a direct current control station or a DC power control station, smoothly switching the control mode of the voltage-source converter to be quitted from a constant current control mode to a constant voltage control mode, decreasing the DC voltage reference value $U_{dV\text{-}ref}$ to 0 at a certain rate of slope; under the control of the DC voltage controller, decreasing the output DC voltage $U_{dV}$ of the voltage-source converter to 0 at a certain rate of slope; when the DC voltage reference value is decreased to 0, the upper and lower bridge arms of each phase of the voltage-source converter to be quitted output voltage reference waves with O-axis symmetry, equal amplitude and reverse phase; the DC voltage $U_{dV}$ output by the voltage-source converter to be quitted is 0.

Step 2: closing the unit bypass switch S1 of the voltage-source converter unit to be quitted, so that the direct current flowing through the voltage-source converter to be quitted is transferred to the unit bypass switch S1;

Step 3: blocking the voltage-source converter to be quitted and opening the AC inlet switch S2 of a converter transformer corresponding to the voltage-source converter unit to be quitted;

Step 4: closing the unit bypass knife gate D3 of the voltage-source converter unit to be quitted, then opening the unit bypass switch S1, the first unit isolation knife gate D1, and the second unit isolation knife gate D2 in sequence to complete the electric isolation of the voltage-source converter to be quitted, quitting the voltage-source converter unit to be quitted.

During the above procedure of on-line quit of the voltage-source converter unit, the on-line normal converter unit quit is operated in the order of quitting the converter unit of the DC voltage control station, then quitting the converter unit of the direct current control station or the DC power control station.

When the voltage-source converter has a malfunction, the fully-controlled switching device of the voltage-source converter needs to be blocked quickly to isolate the malfunction, which causes the voltage-source converter to lost normal control ability. The on-line malfunction quit of the voltage-source converter cannot be implemented according to the above on-line normal quit control method. For this reason, the present disclosure also provides an on-line malfunction quit control method for a voltage-source converter unit. The voltage-source converter unit comprises a first unit isolation knife gate D1, a voltage-source converter, a second unit isolation knife gate D2, which are connected in series, and connecting wires. The starting point and the ending point of the above series connected loop are a first DC point X1 and a second DC point X2 of the voltage-source converter unit respectively for series connecting to other voltage-source converter units. The voltage-source converter unit further comprises a unit bypass knife gate D3, which is bridge jointed between the first DC point X1 and the second DC point X2. The voltage-source converter unit further comprises a unit bypass switch S1, which is bridge jointed between the end Y1 of the first unit isolation knife gate D1 close to the voltage-source converter and the end Y2 of the second unit isolation knife gate D2 close to the voltage-source converter. FIG. 11 illustrates the on-line malfunction quit control method, which comprises the following steps.

Step 1: after identifying the voltage-source converter unit's malfunction by detecting electrical quantity and/or non-electrical quantity, sending an on-line malfunction quit instruction to the converter unit to be quitted;

Step 2: blocking the voltage-source converter to be quitted, and opening the AC inlet switch S2 of a converter transformer corresponding to the voltage-source converter unit to be quitted;

Step 3: closing the unit bypass switch S1 of the voltage-source converter unit to be quitted, so that the direct current flowing through the voltage-source converter to be quitted is transferred to the unit bypass switch S1;

Step 4: closing the unit bypass knife gate D3 of the voltage-source converter unit to be quitted, then opening the unit bypass switch S1, the first unit isolation knife gate D1, and the second unit isolation knife gate D2 in sequence, quitting the voltage-source converter unit to be quitted.

Figure 9:
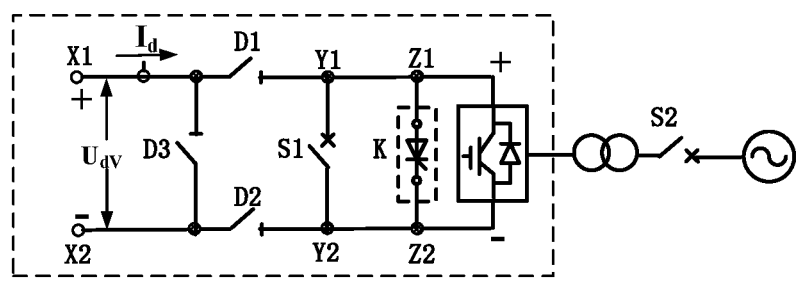
FIG. 9 illustrates a topological diagram of an electronic switch connected in parallel between the positive end and the negative end of the voltage-source converter.
Figure 10:
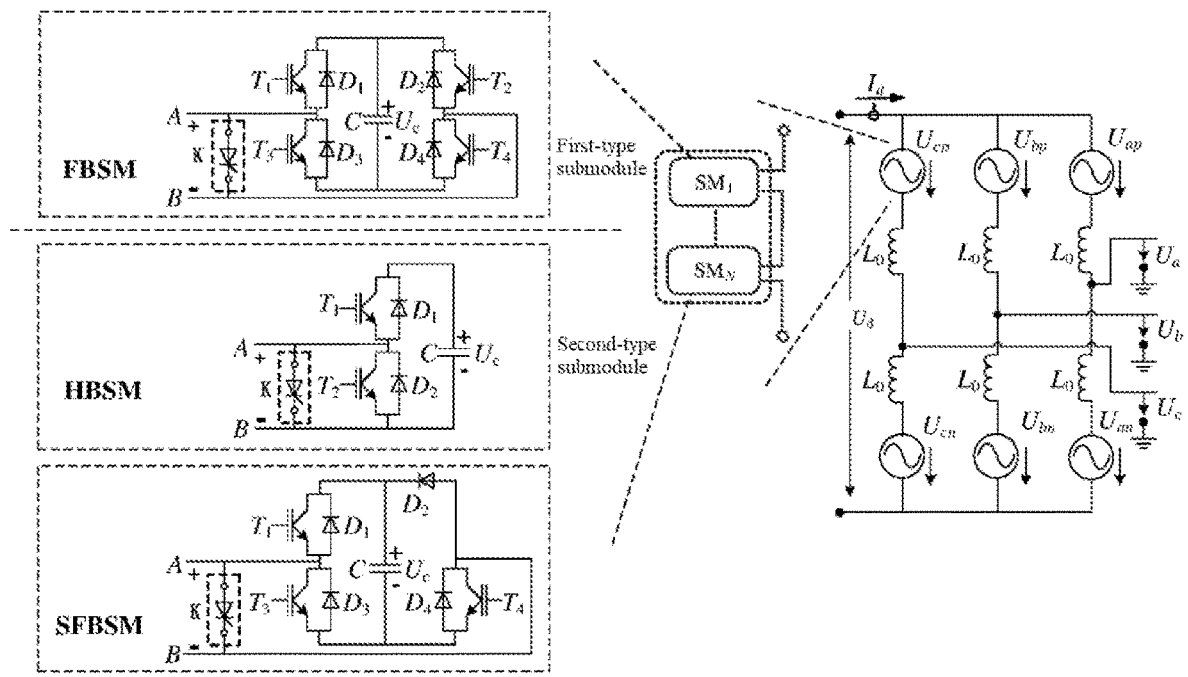
FIG. 10 illustrates a topological diagram of an electronic switch connected in parallel between the positive end and the negative end of the voltage-source converter submodule.

According to the above on-line malfunction quit control method, before closing the unit bypass switch S1 of the voltage-source converter unit to be quitted, there will be an overvoltage. After research, an electronic switch K of the voltage-source converter unit can effectively avoid the overvoltage problem during the on-line malfunction quit procedure. The electronic switch is connected in parallel between the positive end and the negative end of the voltage-source converter or is connected in parallel between the positive end and the negative end of a submodule of the voltage-source converter. The conduction direction of the semiconductor switching device of the electronic switch is consistent with the direction of the direct current flowing through the voltage-source converter, and is keep in an off state during the normal operation of the voltage-source converter. The semiconductor switching device of the electronic switch is a single semiconductor switching device or is a plurality of semiconductor switching devices connected in series and/or in parallel. The semiconductor switching device is a half-controlled switching device, such as a silicon controlled rectifier (SCR), or a fully-controlled switch device, such as IGBT, IGCT, IEGT, GTO, etc. FIG. 9 illustrates a topological diagram of an electronic switch connected in parallel between the positive end and the negative end of the voltage-source converter. FIG. 10 illustrates a topological diagram of an electronic switch connected in parallel between the positive end and the negative end of the voltage-source converter submodule.

In practical engineering application, one phase in the three-phase bridge arms of the voltage-source converter can be chosen. Both the upper and lower bridge arm of the chosen phase are configured with an electronic switch and the other two are not configured to reduce the number of semiconductor switching device used.

It should be noted that, with respect to a series-type flexible direct-current power transmission system with bi-directional flow direct current, it can be configured with two sets of electronic switches connected in parallel back to back to ensure the voltage-source converter's on-line quit can be implemented in both forward and reverse current directions.

With respect to the voltage-source converter unit configured with the electronic switch, step A can be added between step 1 and step 2 of the on-line malfunction quit control method: triggering all the semiconductor switching devices of the electronic switch of the voltage-source converter unit to be quitted to provide a current channel for direct current; step B can be added between step 3 and step 4: blocking all the semiconductor switching devices of the electronic switch of the voltage-source converter unit to be quitted. Adding the above steps can effective avoid the overvoltage problem during the on-line malfunction quit procedure.

In addition, with respect to the voltage-source converter unit configured with the electronic switch, step A can be added between step 1 and step 2 of the on-line normal quit control method: triggering all the semiconductor switching devices of the electronic switch of the voltage-source converter unit to be quitted to provide a current channel for direct current; step B can be added between step 3 and step 4: blocking all the semiconductor switching devices of the electronic switch of the voltage-source converter unit to be quitted. The advantage of adding the above steps is that: it can ensure the DC voltage $U_{dV}$ output by the voltage-source converter is 0 before closing the unit bypass switch S1 of the voltage-source converter unit to be quitted of step 3, so that the unit bypass switch S1 has good closing condition.

The present disclosure also provides an on-line input device for a voltage-source converter unit. The voltage-source converter unit comprises a first unit isolation knife gate D1, a voltage-source converter, a second unit isolation knife gate D2, which are connected in series, and connecting wires. The starting point and the ending point of the above series connected loop are a first DC point X1 and a second DC point X2 of the voltage-source converter unit respectively for series connecting to other voltage-source converter units. The voltage-source converter unit further comprises a unit bypass knife gate D3, which is bridge jointed between the first DC point X1 and the second DC point X2. The voltage-source converter unit further comprises a unit bypass switch S1, which is bridge jointed between the end Y1 of the first unit isolation knife gate D1 close to the voltage-source converter and the end Y2 of the second unit isolation knife gate D2 close to the voltage-source converter. The on-line input device comprises a first operation unit for sequential connection, a charging control unit, a second operation unit for sequential connection, a control unit for deblocking transfer, and an operation adjustment unit, wherein:

The first operation unit for sequential connection is used for closing the second unit isolation knife gate D2 of the voltage-source converter unit to be input, so that the negative end Z2 of the voltage-source converter unit to be input is connected to the second DC point X2 through the second unit isolation knife gate D2 to trigger the charging control unit.

The charging control unit is used for closing the AC inlet switch S2 of a converter transformer corresponding to the voltage-source converter unit to be input to control the charge of the voltage-source converter to be input, and charging the capacitor voltage of each bridge arm submodule of the voltage-source converter to be input to a set threshold to trigger the second operation unit for sequential connection;

The second operation unit for sequential connection is used for stopping the charging control, making the submodule turned on during the charging control to be in a blocked state, closing the unit bypass switch S1 and the first unit isolation knife gate D1 of the voltage-source converter unit to be input, and then opening the unit bypass knife gate D3 to trigger the control unit for deblocking transfer;

The control unit for deblocking transfer is used for deblocking the voltage-source converter to be input and controlling the output DC voltage $U_{dV}$ thereof to be 0, then controlling the voltage-source converter to be input to output negative DC voltage, gradually increasing the amplitude of the negative DC voltage output by the voltage-source converter to be input so as to gradually increase the direct current flowing through the voltage-source converter to be input and gradually decrease the direct current flowing through the unit bypass switch S1; when the direct current flowing through the voltage-source converter to be input has been increased to equal to the measurement value of the direct current of an operating voltage-source converter, opening the unit bypass switch S1 of the voltage-source converter unit to be input to trigger the operation adjustment unit;

The operation adjustment unit is used for, if the converter station of the voltage-source converter unit to be input is a DC voltage control station, controlling the DC voltage $U_{dV}$ output by the voltage-source converter to be input to an operating target value; and if the converter station of the voltage-source converter unit to be input is a direct current control station or a DC power control station, controlling the direct current flowing through the voltage-source converter to be input to an operating target value; then the input of the voltage-source converter unit to be input is completed.

The control unit for deblocking transfer also comprises a zero-voltage deblocking unit. The zero-voltage deblocking unit is used for setting the DC voltage reference value $U_{dV\text{-}ref}$ of the voltage-source converter to be input to be 0 and deblocking; the voltage-source converter is used for outputting voltage reference waves with O-axis symmetry, equal amplitude and reverse phase for upper and lower bridge arms in each phase, so that the DC voltage $U_{dV}$ output by the voltage-source converter to be input is 0.

The present disclosure also provides an on-line quit device for a voltage-source converter unit. The voltage-source converter unit comprises a first unit isolation knife gate D1, a voltage-source converter, a second unit isolation knife gate D2, which are connected in series, and connecting wires. The starting point and the ending point of the above series connected loop are a first DC point X1 and a second DC point X2 of the voltage-source converter unit respectively for series connecting to other voltage-source converter units. The voltage-source converter unit further comprises a unit bypass knife gate D3, which is bridge jointed between the first DC point X1 and the second DC point X2. The voltage-source converter unit further comprises a unit bypass switch S1, which is bridge jointed between the end Y1 of the first unit isolation knife gate D1 close to the voltage-source converter and the end Y2 of the second unit isolation knife gate D2 close to the voltage-source converter. The on-line quit device comprises a DC reduction voltage control unit, a bypass transfer control unit, a converter blocking control unit, and a knife gate sequence operation unit, wherein:

The working method for on-line normal quit operations is as follow.

The DC reduction voltage control unit is used for controlling the output DC voltage $U_{dV}$ of the voltage-source converter to be quitted to 0 to trigger the bypass transfer control unit.

The bypass transfer control unit is used for closing the unit bypass switch S1 of the voltage-source converter unit to be quitted, so that the direct current flowing through the voltage-source converter to be quitted is transferred to the unit bypass switch S1 to trigger the converter blocking control unit.

The converter blocking control unit is used for blocking the voltage-source converter unit to be quitted and opening the AC inlet switch S2 of a converter transformer corresponding to the voltage-source converter unit to be quitted to trigger the knife gate sequence operation unit.

The knife gate sequence operation unit is used for closing the unit bypass knife gate D3 of the voltage-source converter unit to be quitted, then opening the unit bypass switch S1, the first unit isolation knife gate D1, and the second unit isolation knife gate D2 in sequence, quitting the voltage-source converter unit to be quitted.

The working method for on-line malfunction quit operations is as follow.

The converter blocking control unit is used for blocking the voltage-source converter to be quitted, and opening the AC inlet switch S2 of a converter transformer corresponding to the voltage-source converter unit to be quitted to trigger the bypass transfer control unit.

The bypass transfer control unit is used for closing the unit bypass switch S1 of the voltage-source converter unit to be quitted, so that the direct current flowing through the voltage-source converter to be quitted is transferred to the unit bypass switch S1 to trigger the knife gate sequence operation unit.

The knife gate sequence operation unit is used for closing the unit bypass knife gate D3 of the voltage-source converter unit to be quitted, then opening the unit bypass switch S1, the first unit isolation knife gate D1, and the second unit isolation knife gate D2 in sequence, quitting the voltage-source converter unit to be quitted.

With respect to the voltage-source converter unit configured with the electronic switch, the above on-line quit device also comprises an electronic switch control unit, which is used for triggering all the semiconductor switching devices of the electronic switch of the voltage-source converter unit to be quitted to provide a current channel for direct current and used for blocking all the semiconductor switching devices of the electronic switch of the voltage-source converter unit to be quitted.

The above implementations are merely used for illustrating the technical spirit this disclosure, and thus cannot be construed as a limit to the scope of this disclosure. Any technical spirit proposed according to this disclosure and any amendment based on this technical solution should be within the scope of this disclosure.

What is claimed is:

1. An on-line input control method for a voltage-source converter unit, the voltage-source converter unit comprises a first unit isolation knife gate, a voltage-source converter to be input, a second unit isolation knife gate, which are connected in series to form a series connected loop, and connecting wires; a starting point and an ending point of the series connected loop are a first DC point and a second DC point of the voltage-source converter unit respectively for series connecting to other voltage-source converter units; the voltage-source converter unit further comprises a unit bypass knife gate, which is bridge jointed between the first DC point and the second DC point; the voltage-source converter unit further comprises a unit bypass switch, which is bridge jointed between an end of the first unit isolation knife gate close to the voltage-source converter and an end of the second unit isolation knife gate close to the voltage-source converter; the on-line input control method comprises:

when receiving an issued instruction of on-line input of the voltage-source converter unit, closing the second unit isolation knife gate of the voltage-source converter unit to be input, so that a negative end of the voltage-source converter to be input is connected to the second DC point through the second unit isolation knife gate;

closing an AC inlet switch of a converter transformer corresponding to the voltage-source converter unit to be input, controlling a charge of the voltage-source converter to be input, and charging a capacitor voltage of each of bridge arm submodules of the voltage-source converter to be input to a set threshold;

stopping the charging control of the voltage-source converter to be input, making the bridge arm submodules turned on during the charging control to be in a blocked state, closing the unit bypass switch and the first unit isolation knife gate of the voltage-source converter unit to be input, and then opening the unit bypass knife gate;

deblocking the voltage-source converter to be input and controlling an output DC voltage thereof to be 0, then controlling the voltage-source converter to be input to output negative DC voltage, increasing an amplitude of the negative DC voltage output by the voltage-source converter to be input so as to increase a direct current flowing through the voltage-source converter to be input and decrease another direct current flowing through the unit bypass switch of the voltage-source converter unit to be input to achieve transferring direct current from the unit bypass switch to the voltage-source converter to be input; when the direct current flowing through the voltage-source converter to be input has been increased to equal to a measurement value of the direct current of an operating voltage-source converter, opening the unit bypass switch of the voltage-source converter unit to be input; and when a converter station of the voltage-source converter unit to be input is a DC voltage control station, controlling the DC voltage output by the voltage-source converter to be input to a voltage operating target value; and when the converter station of the voltage-source converter unit to be input is a direct current control station or a DC power control station, controlling the direct current flowing through the voltage-source converter to be input to a current operating target value; then the on-line input of the voltage-source converter unit to be input is completed.

2. The on-line input control method for a voltage-source converter unit of claim 1 wherein the deblocking the voltage-source converter unit to be input and controlling the output DC voltage thereof to be 0 specifically comprises:
setting voltage reference waves with O-axis symmetry, equal amplitude and reverse phase for upper and lower bridge arms in each phase of the voltage-source converter to be input and deblocking.

3. The on-line input control method for a voltage-source converter unit of claim 1 further comprising: during the on-line input of the voltage-source converter unit, an order of on-line inputting the voltage-source converter unit is implemented as follow: first, inputting the voltage-source converter unit of the direct current control station or the DC power control station, and then inputting the voltage-source converter unit of the DC voltage control station.

4. An on-line input device for a voltage-source converter unit, the voltage-source converter unit comprises a first unit isolation knife gate, a voltage-source converter to be input, a second unit isolation knife gate, which are connected in series to form a series connected loop, and connecting wires; a starting point and an ending point of the series connected loop are a first DC point and a second DC point of the voltage-source converter unit respectively for series connecting to other voltage-source converter units; the voltage source converter unit further comprises a unit bypass knife gate, which is bridge jointed between the first DC point and the second DC point; and the voltage-source converter unit further comprises a unit bypass switch, which is bridge jointed between an end of the first unit isolation knife gate close to the voltage-source converter and an end of the second unit isolation knife gate close to the voltage-source converter, and wherein the on-line input device comprises a first operation unit for sequential connection, a charging control unit, a second operation unit for sequential connection, a control unit for deblocking transfer, and an operation adjustment unit, wherein:

the first operation unit for sequential connection is configured to close the second unit isolation knife gate of the voltage-source converter unit to be input, so that a negative end of the voltage-source converter unit to be input is connected to the second DC point through the second unit isolation knife gate to trigger the charging control unit;

the charging control unit is configured to close an AC inlet switch of a converter transformer corresponding to the voltage-source converter unit to be input to control a charge of the voltage-source converter to be input, and charge a capacitor voltage of each of bridge arm submodules of the voltage-source converter to be input to a set threshold to trigger the second operation unit for sequential connection;

the second operation unit for sequential connection is configured to stop the charging control of the voltage-source converter to be input, making the bridge arm submodules turned on during the charging control to be in a blocked state, close the unit bypass switch and the first unit isolation knife gate of the voltage-source converter unit to be input, and then open the unit bypass knife gate to trigger the control unit for deblocking transfer;

the control unit for deblocking transfer is configured to deblock the voltage-source converter to be input and controlling an output DC voltage thereof to be 0, then control the voltage-source converter to be input to output negative DC voltage, increase an amplitude of the negative DC voltage output by the voltage-source converter to be input so as to increase a direct current flowing through the voltage-source converter to be input and decrease another direct current flowing through the unit bypass switch of the voltage-source converter unit to be input; when the direct current flowing through the voltage-source converter to be input has been increased to equal to a measurement value of the direct current of an operating voltage-source converter, open the unit bypass switch of the voltage-source converter unit to be input to trigger the operation adjustment unit;

the operation adjustment unit is configured to, when a converter station of the voltage-source converter unit to be input is a DC voltage control station, control the DC voltage output by the voltage-source converter to be input to a voltage operating target value; and when the converter station of the voltage-source converter unit to be input is a direct current control station or a DC power control station, control the direct current flowing through the voltage-source converter to be input to a current operating target value; then the on-line input of the voltage-source converter unit to be input is completed.

5. The on-line input device for the voltage-source converter unit of claim 4, further comprises:
the control unit for deblocking transfer comprising a zero-voltage deblocking unit,
wherein the zero-voltage deblocking unit is configured to set voltage reference waves with O-axis symmetry, equal amplitude and reverse phase for upper and lower bridge arms in each phase of the voltage-source converter to be input and deblocking, so that the DC voltage output by the voltage-source converter to be input is 0.

6. An on-line quit device for a voltage-source converter unit, the voltage-source converter unit comprises a first unit isolation knife gate, a voltage-source converter, a second unit isolation knife gate, which are connected in series to form a series connected loop, and connecting wires; a starting point and an ending point of the above series connected loop are a first DC point and a second DC point of the voltage-source converter unit respectively for series connecting to other voltage-source converter units; the voltage-source converter unit further comprises a unit bypass knife gate, which is bridge jointed between the first DC point and the second DC point; the voltage source converter unit further comprises a unit bypass switch, which is bridge jointed between an end of the first unit isolation knife gate close to the voltage-source converter and an end of the second unit isolation knife gate close to the voltage-source converter, and wherein
the on-line quit device comprises a DC reduction voltage control unit, a bypass transfer control unit, a converter deblocking control unit, and a knife gate sequence operation unit, wherein:
a working method for on-line normal quit operations is as follow:
the DC reduction voltage control unit is configured to control an output DC voltage of the voltage-source converter to be quitted to 0 to trigger the bypass transfer control unit;
the bypass transfer control unit is configured to close the unit bypass switch of the voltage-source converter unit to be quitted, so that a direct current flowing through the voltage-source converter to be quitted is transferred to the unit bypass switch to trigger the converter deblocking control unit;
the converter blocking control unit is configured to block the voltage-source converter unit to be quitted and open an AC inlet switch of a converter transformer corresponding to the voltage-source converter unit to be quitted to trigger the knife gate sequence operation unit;
the knife gate sequence operation unit is configured to close the unit bypass knife gate of the voltage-source converter unit to be quitted, then open the unit bypass switch, the first unit isolation knife gate, and the second unit isolation knife gate in sequence, quit the voltage-source converter unit to be quitted; and a working method for on-line malfunction quit operations is as follow:
the converter blocking control unit is configured to block the voltage-source converter to be quitted, and open the AC inlet switch of the converter transformer corresponding to the voltage-source converter unit to be quitted to trigger the bypass transfer control unit;
the bypass transfer control unit is configured to close the unit bypass switch of the voltage-source converter unit to be quitted, so that the direct current flowing through the voltage-source converter to be quitted is transferred to the unit bypass switch to trigger the knife gate sequence operation unit;
the knife gate sequence operation unit is configured to close the unit bypass knife gate of the voltage-source converter unit to be quitted, then open the unit bypass switch, the first unit isolation knife gate, and the second unit isolation knife gate in sequence, quit the voltage-source converter unit to be quitted.

7. The on-line quit device for the voltage-source converter unit of claim 6, the voltage-source converter unit also comprises an electronic switch formed by at least one semiconductor switching device; the electronic switch is connected in parallel between a positive end and a negative end of the voltage-source converter or is connected in parallel between a positive end and a negative end of a submodule of the voltage-source converter; a conduction direction of the at least one semiconductor switching device of the electronic switch is consistent with a direction of the direct current flowing through the voltage-source converter, and is kept in an off state during a normal operation of the voltage-source converter; the at least one semiconductor switching device of the electronic switch is a single semiconductor switching device or is a plurality of semiconductor switching devices connected in series and/or in parallel; wherein the voltage-source converter unit further comprises an electronic switch control unit, which is configured to trigger all the semiconductor switching devices of the electronic switch of the voltage-source converter unit to be quitted to provide a current channel for direct current and block all the semiconductor switching devices of the electronic switch of the voltage-source converter unit to be quitted.

* * * * *